(12) United States Patent
Kim et al.

(10) Patent No.: US 12,280,279 B2
(45) Date of Patent: Apr. 22, 2025

(54) SYSTEM AND METHOD FOR HIGH-PRECISION FIRE SIMULATION-BASED VIRTUAL FIRE TRAINING INTERACTION AND METHOD FOR PROCESSING FIRE SIMULATION-BASED VIRTUAL FIRE TRAINING ZONE INTERACTION

(71) Applicant: Electronics and Telecommunications Research Institute, Daejeon (KR)

(72) Inventors: Hae Dong Kim, Daejeon (KR); Kyung Ho Jang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 221 days.

(21) Appl. No.: 18/073,810

(22) Filed: Dec. 2, 2022

(65) Prior Publication Data

US 2023/0293926 A1 Sep. 21, 2023

(30) Foreign Application Priority Data

Mar. 18, 2022 (KR) .................. 10-2022-0034224

(51) Int. Cl.
*A62C 99/00* (2010.01)
*G09B 9/00* (2006.01)

(52) U.S. Cl.
CPC ............ *A62C 99/0081* (2013.01); *G09B 9/00* (2013.01)

(58) Field of Classification Search
CPC ........ A62C 99/0081; G09B 9/00; G09B 9/05; G09B 5/00
See application file for complete search history.

(56) References Cited

U.S. PATENT DOCUMENTS

| | | |
|---|---|---|
| 2012/0122062 A1 | 5/2012 | Yang et al. |
| 2016/0042656 A1 | 2/2016 | Lee |
| 2020/0105420 A1* | 4/2020 | Malota ................ G16H 50/20 |
| 2021/0370117 A1 | 12/2021 | Park et al. |

FOREIGN PATENT DOCUMENTS

| | | |
|---|---|---|
| JP | 2019-138965 A | 8/2019 |
| KR | 10-1518306 B1 | 5/2015 |
| KR | 10-1569271 B1 | 11/2015 |
| KR | 10-1875170 B1 | 7/2018 |
| KR | 10-2020-0008694 A | 1/2020 |
| KR | 10-2113545 B1 | 6/2020 |
| KR | 10-2021-0013900 A | 2/2021 |
| KR | 10-2300082 B1 | 9/2021 |
| KR | 10-2021-0148765 A | 12/2021 |

OTHER PUBLICATIONS

Song, Yiquan, et al., "Combinatorial Spatial Data Model for Building Fire Simulation and Analysis." ISPRS International Journal of Geo-Information 8.9 (2019): 408, (21 pages).

* cited by examiner

*Primary Examiner* — Timothy A Musselman
(74) *Attorney, Agent, or Firm* — NSIP Law

(57) ABSTRACT

The present invention provides a system and method for high-precision fire simulation-based virtual fire training interaction that features a fire suppression support virtual fire training interaction that combines a scientific fire simulation (FDS) result expression technology used for fire situation analysis and a real-time interaction technology processing dynamic changes in order to have more realistic training in virtual fire training such as fire suppression.

14 Claims, 4 Drawing Sheets

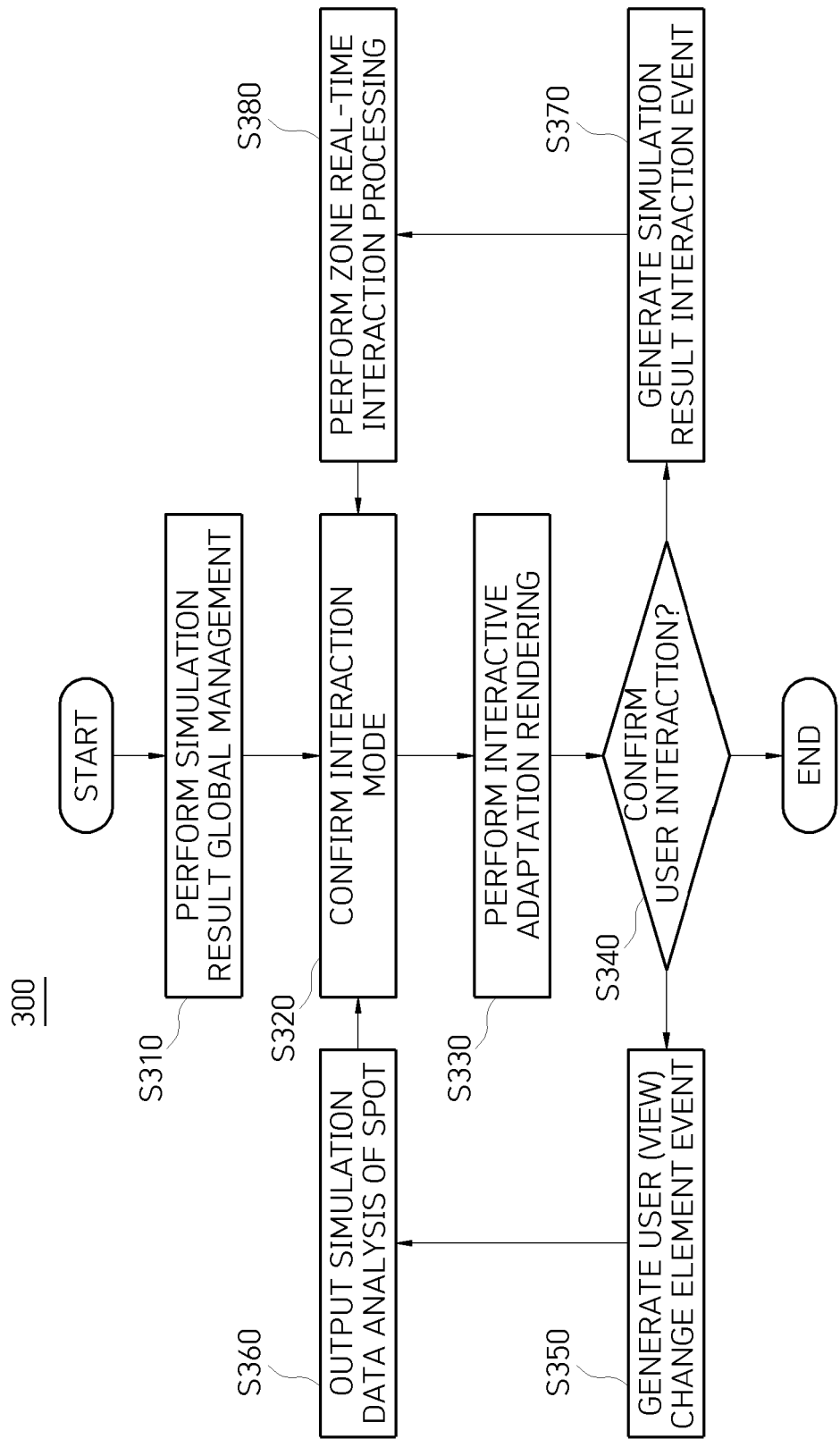

SYSTEM AND METHOD FOR HIGH-PRECISION FIRE SIMULATION-BASED VIRTUAL FIRE TRAINING INTERACTION AND METHOD FOR PROCESSING FIRE SIMULATION-BASED VIRTUAL FIRE TRAINING ZONE INTERACTION

CROSS-REFERENCE TO RELATED APPLICATIONS

This application claims the benefit under 35 USC § 119 (a) of Korean Patent Application No. 10-2022-0034224, filed on Mar. 18, 2022, in the Korean Intellectual Property Office, the entire disclosure of which is incorporated herein by reference for all purposes.

BACKGROUND

1. Field of the Invention

The present invention relates to a system and method for high-precision fire simulation-based virtual fire training interaction, and more particularly, to a system and method for high-precision fire simulation-based virtual fire training interaction that features a fire suppression support virtual fire training interaction that combines a scientific fire simulation (FDS) result expression technology used for fire situation analysis and a real-time interaction technology processing dynamic changes in order to have more realistic training in virtual fire training such as fire suppression.

2. Discussion of Related Art

In general, a fire means disaster caused by fire, and may be classified into a general fire, oil fire, an electric fire, a metal fire, a chemical fire, etc., depending on a type of combustion and a cause of ignition With the development of computers, a method for simulation or fire suppression simulation for fire disaster evacuation training in order to minimize damage to human life and property due to these various fires are being actively developed and used.

As the related conventional technology, a technology that sets an initial environment for a fire growth process in consideration of physical factors in real life and interprets and expresses scientifically precisely calculated results is required in the fields used for fire analysis, fire evacuation, and the like by visualizing the fire dynamics simulator (FDS) results, and a technology of expressing an fire environment and situation based on an experience of content creators, an interaction technology of changing and processing simulation result values by reflecting a fire phenomenon and interaction, a technology of visualizing a fire in real time, and the like are required in the fields of creating real-time interactive content such as computer games in various fire environments.

There is a demand for virtual fire training content due to the danger of fire training and the need for various trainings, so a fire training system is developed based on a high-quality fire space environment (expression of buildings, factories, real-world objects, etc.) using commercial authoring software (SW), but as questions are raised about the effectiveness of the training due to the separation of the existing real-time fire visualization from the actual fire spread process, the opinion that virtual training is regarded as simply a computer game and thus is not helpful for fire training has been raised.

Accordingly, in the case of making fire dynamics simulator results into virtual training content to utilize realistic and scientific fire simulation results, there is a problem of interpreting encoded results, and there is a problem in that a method for changing a fire simulation result to process real-time interaction are not provided, so it is not possible to create fire interactive content such as fire suppression, and a lot of effort is required to link with a VR device (e.g., HMD) that provides an interface in commercial authoring SW as a basis, resulting in an increase in content production period and production cost.

RELATED ART DOCUMENT

Patent Document

Korean Patent No. 10-2158414

SUMMARY OF THE INVENTION

The present invention provides a system and method for high-precision fire simulation-based virtual fire training interaction that features a fire suppression support virtual fire training interaction that combines a scientific fire simulation (FDS) result expression technology used for fire situation analysis and a real-time interaction technology processing dynamic changes in order to have more realistic training in virtual fire training such as fire suppression.

According to an aspect of the present invention, a system for high-precision fire simulation-based virtual fire training interaction include: a simulation result management module unit configured to receive entire area result information of a fire dynamics simulator (FDS) and interpret and process the entire area result information with an expression space coordinate system, and analyze and process on any one of zone areas requiring additional zone processing with the expression space coordinate system to represent a three-dimensional simulation result; an interactive mode management module unit configured to set and manage a processing procedure to be reflected in the interactive adaptation rendering module unit according to a simulation result and an interaction data type; a zone interaction processing module unit configured to generate and manage an interaction data processing accumulation map for an element changing the simulation result, and process and manage an area requiring a correction of the simulation result; and an interactive adaptation rendering module unit configured to express a fire situation by adding the result to an existing rendering method according to mode setting of the interactive mode management module unit based on the simulation result.

The simulation result management module unit may include: a simulation result global input module unit configured to receive the entire area data; a simulation result spot input module unit configured to receive additional data of the zone area; a global-zone area management module unit configured to increase efficiency in data application by dividing and managing an area where a change is required in the zone area among the simulation results; and a spot data analysis module unit configured to interpret a temperature or carbon dioxide ($CO_2$) simulation result of the zone area from the simulation result.

The interactive mode management module unit may include: a user navigation mode management module unit configured to obtain location and direction data of a user from a user location change device, output a result, and transmit the result to the interactive adaptation rendering module unit; and a simulation result interactive mode management module unit configured to transmit the interaction data input information giving a change in a fire expression result to the zone interaction processing module unit.

The zone interaction processing module unit may include: a zone interaction information setting module unit configured to set an interaction area in the zone area; and a simulation result change interaction data processing module unit configured to accumulate and process the interaction data in a 3D spatial map within the corresponding area set by the zone interaction information setting module unit.

The interactive adaptation rendering module unit may include: a fire dynamics simulator result rendering module unit configured to determine a user's view in a mode that moves within a scene without changing the simulation result; and when the simulation result needs to be changed, a simulation result interactive adaptation zone rendering module unit configured to perform rendering to weaken a fire expression value of the simulation result by reflecting the interaction data processing map provided from the zone interaction processing module unit.

The fire dynamics simulator result global input module unit may convert and load the simulation result data, which is run-length encoded binary data, into decoded 3D volume data.

The fire dynamics simulator result point input module unit may receive the corresponding spot value from the fire dynamics simulator result global input module unit, or load and decode only the corresponding data at a location of the zone area among the run-length encoding data which is an original result to receive information. It is also possible to load only the data corresponding to the location of the zone area among the previously decoded data.

According to another aspect of the present invention, a method for high-precision fire simulation-based virtual fire training interaction includes: a simulation result management step performed by a simulation result management module unit, and receiving an entire area result information of a fire dynamics simulator (FDS) and interpreting and processing the entire area result information with an expression space coordinate system, and analyzing and processing any one of zone areas requiring additional zone processing with the expression space coordinate system to represent a three-dimensional simulation result; an interactive mode management step performed by an interactive mode management module unit, and setting and managing a processing procedure to be reflected in an interactive adaptation rendering module unit according to a simulation result and an interaction data type; a zone interaction processing step performed by a zone interaction processing module unit of module unit, and generating and managing an interaction data processing accumulation map for an element changing the simulation result, and processing and managing an area requiring a correction of the simulation result; and an interactive adaptation rendering step performed by the interactive adaptation rendering module unit, and expressing a fire situation by adding the result according to mode setting of the interactive mode management module unit based on the simulation result.

The simulation result management step may include: a simulation result global input step performed by a simulation result global input module unit and receiving entire area data; a simulation result spot input step performed by a simulation result global input module unit and receiving data of a zone area; a global-zone area management step performed by a global-zone area management module unit, and increasing efficiency in data application by dividing and managing an area requiring a change in the zone area among the simulation results; and a spot data analysis step performed by a spot data analysis module unit, and analyzing temperature or carbon dioxide ($CO_2$) simulation result of the zone area in the simulation result.

The interactive mode management step may include: a user navigation mode management step performed by a user navigation mode management module unit, and obtaining location and direction data of a user from a user location change device, output a result, and transmit the result to the interactive adaptation rendering module unit; and a simulation result interaction mode management step performed by a simulation result interactive mode management module unit, and transmitting the interaction data input information giving a change in a fire expression result to the zone interaction processing module unit.

The zone interaction processing step may include: a zone interaction information setting step performed by a zone interaction information setting module unit, and setting an interaction area in the zone area; and a simulation result change interaction data processing step performed by a simulation result change interaction data processing module unit, and accumulating and processing the interaction data in a 3D spatial map within the corresponding area set by the zone interaction information setting module unit.

The interactive adaptation rendering step may include: a fire dynamics simulator result rendering step performed by a fire dynamics simulator result rendering module unit, and determining a user's view in a mode that moves within a scene without changing the simulation result; and a simulation result interactive adaptation zone rendering step performed by a simulation result interactive adaptation zone rendering module unit, and when the simulation result needs to be changed, performing rendering that weakens a fire expression value of the simulation result by reflecting the interaction data processing map provided from the zone interaction processing module unit.

The fire dynamics simulator result global input step may include converting and loading the simulation result data, which is run-length encoded binary data, into decoded 3D volume data. The corresponding step may be a pre-processing process, and may save the fire expression time by converting into decoded 3D volume data. In particular, elements necessary for visualization of fire training, such as fire and smoke, are targeted for application of major global data.

The fire dynamics simulator result point input step may include loading and decoding data of the corresponding location among the additionally encoded simulation data when the fire dynamics simulator result global input module unit information is used or when there is no information, and receiving the information.

According to still another aspect of the present invention, a method for processing high-precision simulation-based zone interaction includes: a static result data generating step performed by a static result data generation unit, and decoding and generating static result data generated by performing simulation according to an initial setting; a dynamic result data generating step performed by a dynamic result data generation unit and generating data representing a change in the simulation result data; a result data combining step performed by a result data combining unit, and combining the static result data and the dynamic result data to generate synthesis result data; and an interactive adaptation rendering step performed by an interactive adaptation rendering unit, and receiving interaction data, generating the interaction data and the synthesis result data, and performing interactive adaptation rendering.

BRIEF DESCRIPTION OF THE DRAWINGS

FIG. 7 is a flowchart for describing a method for high-precision fire simulation-based virtual fire training interaction according to an embodiment of the present invention.

DETAILED DESCRIPTION OF EXEMPLARY EMBODIMENTS

Hereinafter, preferred examples are presented to help the understanding of the present invention. However, the following embodiments are only provided for easier understanding of the present invention, and the contents of the present invention are not limited by the embodiments.

Hereinafter, a system and method for high-precision fire simulation-based virtual fire training interaction and method according to the present invention and various embodiments of the present invention will be described in detail with reference to FIGS. 1 to 7.

Figure 1:
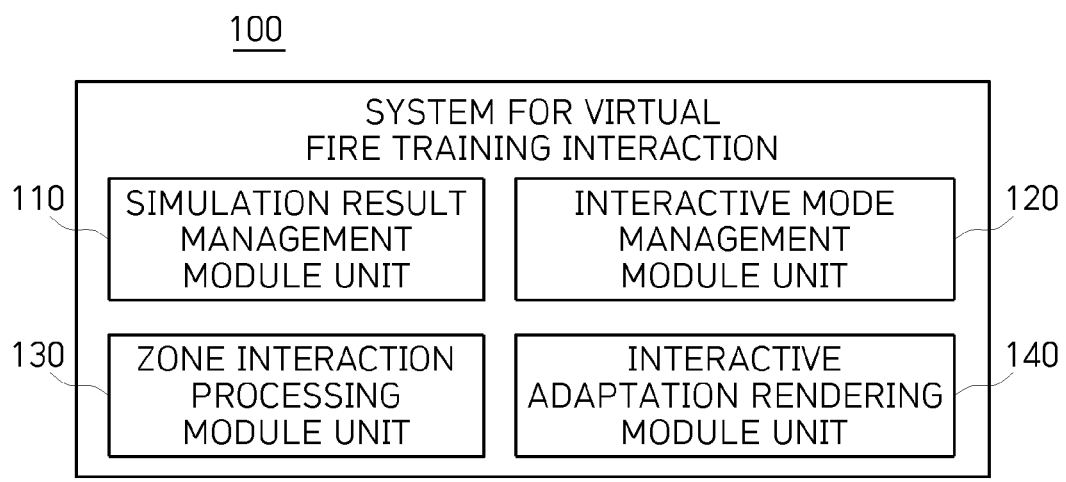
FIG. 1 is a diagram for describing a system 100 for a high-precision fire simulation-based virtual fire training interaction according to an embodiment of the present invention.

FIG. 1 is a diagram for describing a system 100 for a high-precision fire simulation-based virtual fire training interaction according to an embodiment of the present invention.

Referring to FIG. 1, the system 100 for high-precision fire simulation-based virtual fire training interaction may be configured to include a simulation result management module unit 110, an interactive mode management module unit 120, a zone interaction processing module unit 130, and an interactive adaptation rendering module unit 140. Each module unit is divided into 2 to 4 sub-modules, and a combination of sub-modules may be performed or, if necessary, may be called and used to perform the role of each module unit.

The simulation result management module unit 110 may receive entire area result information of a fire dynamics simulator (FDS) and interpret and process the entire area result information with an expression space coordinate system, and analyze and process any one (e.g., temperature and $CO2$) of zone areas requiring additional zone processing with the expression space coordinate system to represent a three-dimensional (3D) simulation result. As an example of analysis processing with a unity expression space coordinate system, which is a commercial software, it means that right-hand coordinate system data of a Z-axis height, which is a fire dynamics simulator (FDS) space coordinate, is interpreted and processed as left-hand coordinate system data of a Y-axis height which is a unity expression space coordinate. The simulation result management module unit 110 may include decoding of simulation result run-length encoding data.

The interactive mode management module unit 120 may set and manage a processing procedure to be reflected in the rendering module unit 140 according to simulation results and an interaction data type.

The zone interaction processing module unit 130 may generate and manage an interaction data processing accumulation map for an element changing the simulation result, and process and manage an area requiring a correction of the simulation result.

The interactive adaptation rendering module unit 140 may represent the results by adding a fire situation in consideration of a depth relationship of the existing rendering method according to mode setting of the interactive mode management module unit 120 based on three-dimensional simulation result data (three-dimensional volume data or three-dimensional particle data) provided from the simulation result management module unit 110.

In addition, the simulation result management module unit 110 may prepare the decoded data in the pre-processing process to reduce the burden on real-time fire visualization. The interaction processing accumulation map configuration by setting the zone area where the interaction is processed is processed as a preset step of the zone interaction processing module unit 130, and the fire situation may be expressed in such a way that values interacted with the map are accumulated during the interaction processing, and fire is weakened based on the accumulated values at the time of rendering.

Figure 2:
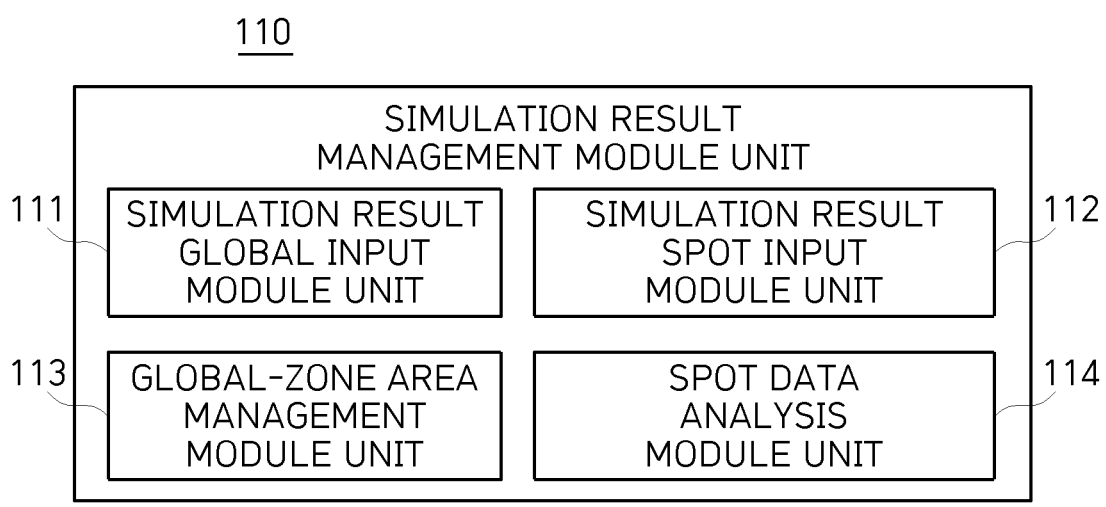
FIG. 2 is a diagram for describing a simulation result management module unit 110 according to an embodiment of the present invention.

FIG. 2 is a diagram for describing the simulation result management module unit 110 according to an embodiment of the present invention.

Referring to FIG. 2, the simulation result management module unit 110 may be configured to include, as a detailed module, a simulation result global input module unit 111, a simulation result spot input module unit 112, a global-zone area management module unit 113, and a spot data analysis module unit 114.

The simulation result global input module unit 111 may receive the entire area data, and the simulation result spot input module unit 112 may receive data of a specific spot of the zone area.

In addition, the simulation result global input module unit 111 is a data preprocessing module, and since the fire simulation result data is run-length encoded binary data, the entire area may be converted into decoded 3D volume data in advance and loaded. The simulation result global input module unit 111 serves to generate fire simulation result data files of each 3D volume for fire, smoke, temperature, and a carbon dioxide concentration by performing decoding in advance before expressing fire and selectively receive the fire simulation result data files. Since data is stored in each data file according to the same time sequence, if necessary, the corresponding data may be bundled into the corresponding data in the same time sequence and packaged and used. The simulation result global input module unit 111 also serves to integrate data stored by dividing the simulation results into several continuous geometric spaces into the desired number of geometric spatial data for easy access. Particle data may be extracted from the decoded fire simulation result 3D volume data and used as 3D particle data. If necessary, input data may be processed in advance to enable real-time expression by grouping a large amount of particle data to reduce the number of particle data.

In addition, since the simulation result spot input module unit 112 requires only the information of the designated location in the 3D volume, the simulation result spot input module unit 112 serves to receive necessary information by loading and decoding only the location of the corresponding part of the fire dynamics simulator result global input module unit 111 or the existing encoded data.

The global-zone area management module unit 113 may increase efficiency in data application by dividing and managing an area requiring a change in the zone area among the simulation results.

In addition, the global-zone area management module unit 113 is a module that receives, as information, a zone area (e.g., a room, a bathroom, etc.) which may be divided into a closed space in the entire fire simulation area (e.g., the entire house), and manages the corresponding geometric information and structure. If necessary, the result data of the fire dynamics simulator global input module unit 111 may serve to be separately stored and managed for each required area, and may be processed in advance in a structured form. In particular, when processing the interaction such as the fire suppression that changes the fire simulation result, it serves to support information and processing of the zone space for the separated zone space.

The spot data analysis module unit 114 may interpret the temperature and carbon dioxide ($CO_2$) simulation results of the zone area in the fire simulation.

In addition, the spot data analysis module unit 114 analyzes the corresponding fire element for the input data of the fire dynamics simulator result spot input module unit 112. As an example, when it is desired to obtain a temperature of a point at time t and position p, it is possible to obtain decoded data (0 to 254) for the temperature of the point at the time t and the position p in the run-length encoded binary data, which is the fire simulation (FDS) result, by the simulation result spot input module unit 112, and serve to interpret, convert, and output data decoded by the spot data analysis module unit 114 as temperature data according to the simulation setting situation. As an example of the temperature analysis method according to the system's manual, the decoded value is 0 to 254, the room temperature value and the maximum temperature set for the simulation are used, and if there is no special setting, the default value is applied to perform the calculation. That is, the temperature is calculated as "decoding value*maximum temperature/254+ room temperature value."

Figure 3:
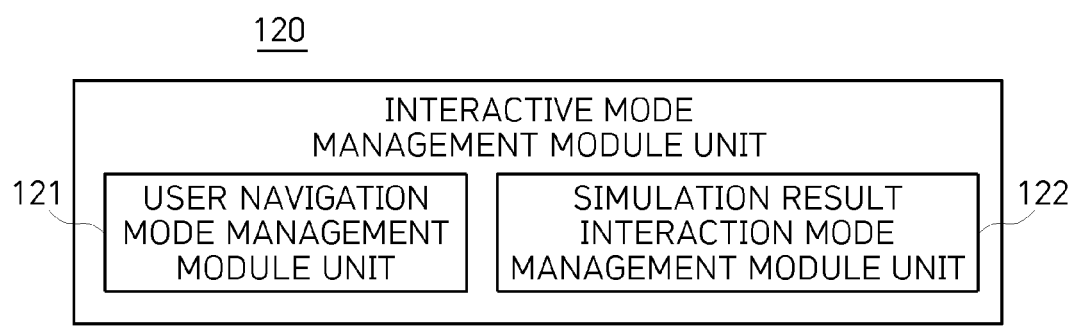
FIG. 3 is a diagram for describing an interactive mode management module unit 120 according to an embodiment of the present invention.

FIG. 3 is a diagram for describing the interactive mode management module unit 120 according to the embodiment of the present invention.

Referring to FIG. 3, the interactive mode management module unit 120 is configured to include the user navigation mode management module unit 121 and the simulation result interactive mode management module unit 122, and serves to process information input from an external connection device according to the interaction mode.

The user navigation mode management module unit 121 may obtain the user's location and direction data from the user location change device, output the result, and transmit the results to the interactive adaptation rendering module unit 140. Here, the user location changing device may be at least one of a keyboard, a mouse interface, and a location/ direction output device interworking with a display.

The simulation result interactive mode management module unit 122 may transmit interaction input information, which changes the fire simulation result, such as fire suppression, to the zone interaction processing module unit 130.

For example, the simulation result interaction mode management module unit 122 may receive information such as the direction and intensity of spraying water with a fire hose as an input interface and provide information to process the interaction effect. Since the commercial system uses the 3D particle system for the corresponding part, the location, size, and velocity information of the 3D particle data is transmitted to the zone interaction processing module unit 130.

Figure 4:
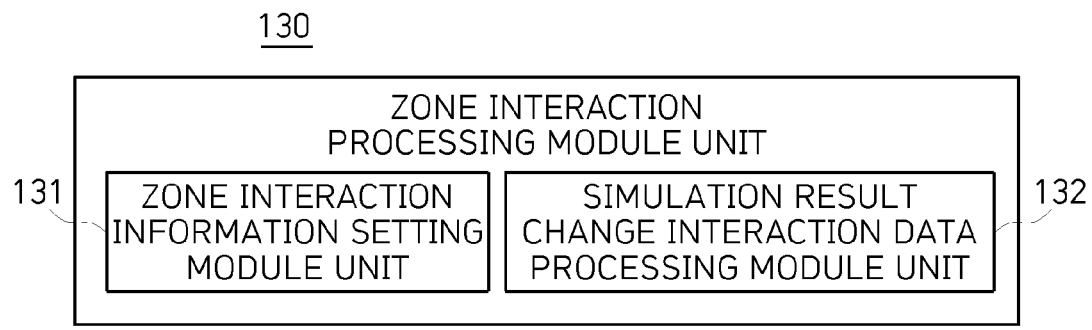
FIG. 4 is a diagram for describing a zone interaction processing module unit 130 according to an embodiment of the present invention.

FIG. 4 is a diagram for describing the zone interaction processing module unit 130 according to the embodiment of the present invention.

Referring to FIG. 4, the zone interaction processing module unit 130 may be configured to include a zone interaction information setting module unit 131 and a simulation result change interaction data processing module unit 132, and serves to process the interaction information that changes the fire simulation result. In addition, the zone interaction information setting module unit 131 may serve to set an interaction area for a zone space that may be viewed as an independent space. A three-dimensional interaction processing map may be configured so that the degree of interactive adaptation may be calculated by dividing the three-dimensional space, and the map may be configured by being divided in detail. That is, the 3D interaction processing map may be configured with a voxel concept in which the corresponding space is divided in order to set the interaction area space in the corresponding zone 3D space and store the interaction information.

The simulation result change interaction data processing module unit 132 may serve to accumulate the interaction data in the 3D spatial map (interaction processing map) in the corresponding area set by the zone interaction information setting module unit 131. For example, when water is sprayed onto the fire area for the fire suppression, it may be configured in such a way to accumulate and store the degree of water sprayed in a voxel where the space where the water is sprayed and the 3D interaction processing map overlap. When water is expressed using the 3D particles, it may be configured and managed in a way to accumulate and store processing information of water particles in voxels where the 3D interaction processing map overlaps a location occupied by the water particles.

Figure 5:
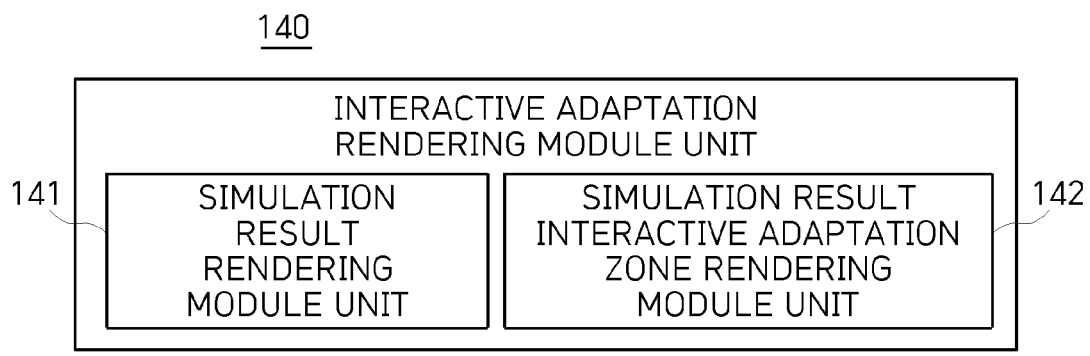
FIG. 5 is a diagram for describing, by way of example, a configuration diagram of a processing procedure of an interactive adaptation rendering module unit 140 according to an embodiment of the present invention.

FIG. 5 is a diagram for describing, as an example, a configuration diagram of a processing procedure of the interactive adaptation rendering module unit 140 according to an embodiment of the present invention.

Referring to FIG. 5, the interactive adaptation rendering module unit 140 may be configured to include a simulation result rendering module unit 141 and a simulation result interactive adaptation zone rendering module unit 142, and serves to perform rendering according to the interactive mode setting procedure.

The simulation result rendering module unit 141 is a module that determines the user's view in the mode in which the user moves within the scene without changing the fire simulation result, and is a module unit that renders according to the user's position direction movement data provided from the interactive mode management module unit 120. In other words, the simulation result rendering module unit 141 is a module that renders the static results of the fire simulation by reflecting a change in a camera object (mainly a main camera) connected to the user's view in the commercial authoring software (SW) to determine the view, and may provide fire-related element (e.g., temperature, carbon dioxide ($CO_2$)) information as information on a specific spot in addition to the fire expression by text character information or graphic information to provide input information of a device (e.g., thermal sense expression device) capable of expressing the corresponding element.

When it is necessary to change the fire simulation result, such as the fire suppression, the simulation result interactive mode management module unit 142 may perform the rendering in a way to weaken the fire expression values of the fire simulation results by reflecting the interaction processing map (accumulative information of the interactive processing in the three-dimensional space) provided from the zone interaction processing module unit 130. Basically, the simulation result rendering module unit 141 may be basically performed, and the two modules may be simultaneously combined and performed in consideration of the mutual depth relationship depending on the interaction mode.

Figure 6:
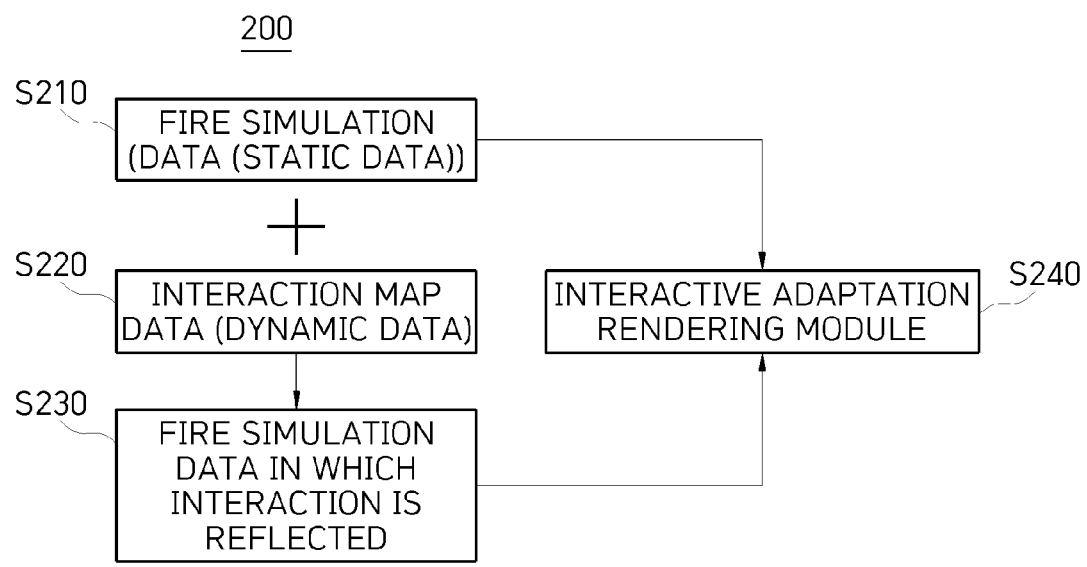
FIG. 6 is a flowchart for describing a flow of zone interaction processing according to an embodiment of the present invention.

FIG. 6 is a flowchart for describing a flow of zone interaction processing according to an embodiment of the present invention.

Referring to FIG. 6, the high-precision fire simulation data is the static result data in which the simulation is performed according to the initial setting, and the fire spread is expressed based on scientific fact (S210). That is, the high-precision fire simulation data may be used in the field of visualization, such as providing temperature according to a specific location in the user navigation mode or acquiring fire simulation data information such as fire evacuation.

In addition, in the case of changing and expressing the fire simulation data such as the fire suppression in addition to the method for providing temperature data according to a location in user navigation, dynamic data such as map data may be generated (S220), and the static and dynamic data are combined (S230) to transmit the fire simulation data reflecting the interaction to the interactive adaptation rendering module so that the fire expression that reflects the interaction is made, thereby expressing the interaction-processed fire spread (S240).

FIG. 7 is a flowchart for describing a method for high-precision fire simulation-based virtual fire training interaction according to an embodiment of the present invention.

Referring to FIG. 7, when the system for virtual fire training interaction is operated, the fire dynamics simulator result global management module is performed (S310). The fire dynamics simulator result global management module serves to load and manage the fire dynamics simulator result data into the system for virtual fire training interaction. According to the interactive mode confirmation results (S320), a procedure of performing interactive adaptation rendering (S330) may be differently performed. The fire expression results may be expressed in combination with the rendering of the existing commercial authoring SW. By confirming the user interaction (S340), it is possible to determine how a user interacts with a current situation (scene) to determine the next rendering method according to the user interaction. In the case of occurrence of a user view change element event (S350), the simulation analysis results (e.g., temperature) to be output according to the view information (camera position direction information interworking with a normal view) changed by the simulation data analysis output (S360) of the spot is output, and in the case of simulation result interaction event occurrence (S370), zone real-time interaction processing (S380) is performed using the three-dimensional interaction processing map, and the corresponding information is transmitted to be reflected in the rendering the interaction mode confirmation (S320) and is rendered by the interactive adaptation rendering (S330). In particular, when both modes are generated at the same time, the interactive adaptation rendering (S330) is performed by applying both modes. When the termination of the system is selected in the user interaction (S340), the virtual fire training interaction system is terminated.

The present invention relates to that system for virtual fire training interaction capable of interpreting the encoded data so that scientifically precise fire simulation results may be visualized in real-time in the commercial authoring SW, and expressing the real-time fire situation in the changed form on the fixed fire simulation results by managing the fixed fire simulation results with the information accumulated in the interaction processing map with the user like the method for interpreting and expressing data required at a specific point, such as temperature and the fire suppression. It is possible to increase the realism of the fire spread expression by using the scientific and realistic high-precision fire simulation results and generate various fire space environment contents with the commercial authoring SW and process real-time interaction, and as a result, it may be used to develop real-time interactive content systems such as realistic virtual fire training and virtual fire evacuation training.

In addition, it is differentiated from other technology methods in that the real-time fire expression may be achieved by processing the dynamic interaction by introducing the results determined by the scientifically precise fire simulation (static results) based on the initial setting and a new concept of the 3D real-time interactive processing map. That is, when the existing non-real-time high-precision fire simulation results depend only on the initial environment setting and there is a change on the way due to the real-time interaction, since it is necessary to perform the non-real-time fire simulation again, it may not be used for the real-time interaction, and it is differentiated in that the static change is changed by newly introducing a 3D real-time interaction processing map and applying the 3D real-time interaction processing map to the dynamic change that require the real-time interaction processing such as the fire suppression to express a fire using the realistic high-precision fire simulation results.

By enabling the production of virtual fire content using the commercial SW through the real-time interaction processing using the commercial authoring SW interface, it may be used for fire suppression virtual fire training, fire evacuation training, and the like, and it is possible to produce the content that apply the realistic fire simulation results even in the computer game content. It is considered that the fire-related virtual reality/augmented reality market, the fire-related real-time virtual training content market, and the like are applicable fields by expanding to the virtual reality/augmented reality system and the ultra-high-resolution content market such as a movie that requires a fire scene preview or an expression of a fire scene.

The present invention described above proposes a methodology so that the present invention may be basically utilized in the art to which the present invention pertains, and the optimal method for the calculation method or the setting of specific values may vary depending on the acquisition environment, and may vary depending on the contents to be expressed or emphasized, and therefore will be omitted.

Accordingly, the embodiment of the present invention may be implemented as a computer-implemented method, or as a non-transitory computer-readable medium having computer-executable instructions stored thereon. In one embodiment, when executed by the processor, the computer-readable instructions may perform a method according to at least one aspect of the present disclosure.

The communication device 1320 may transmit or receive a wired signal or a wireless signal.

In addition, the method according to the present invention may be implemented in a form of program instructions that may be executed through various computer means and may be recorded in a computer-readable recording medium.

The computer-readable recording medium may include a program instruction, a data file, a data structure or the like, alone or a combination thereof. The program instructions recorded in the computer-readable recording medium may be configured by being especially designed for the embodiment of the present invention, or may be used by being known to those skilled in the field of computer software. The computer-readable recording medium may include a hardware device configured to store and execute the program instructions. Examples of the computer-readable recording medium may include a magnetic medium such as a hard disk, a floppy disk, and a magnetic tape, optical media such as a compact disk read only memory (CD-ROM) or a digital versatile disk (DVD), a magneto-optical medium such as a floptical disk, a ROM, a RAM, a flash memory, or the like. Examples of the program instructions may include a high-level language code capable of being executed by a computer using an interpreter, or the like, as well as a machine language code made by a compiler.

According to the invention, by combining a real-time dynamic interaction technology such as a fire suppression operation with a commercial SW authoring system by using static results of high-precision simulation initially set in non-real time, it is possible to create various types of scientific and realistic fire training content.

In addition, the present invention is an interaction processing technology, and thus, can implement development into a system for processing interaction with fire dynamics simulator results without using commercial SW, and propose an interworking method using a commercial SW interface, so it is possible to expand development into virtual reality/augmented reality systems by easily linking a virtual reality device with commercial software.

Although exemplary embodiments of the present invention have been disclosed above, it may be understood by those skilled in the art that the present invention may be variously modified and changed without departing from the scope and spirit of the present invention described in the following claims.

What is claimed is:

1. A system for high-precision fire simulation-based virtual fire training interaction, comprising:
   a simulation result management module unit configured to receive entire area result information of a fire dynamics simulator (FDS) and interpret and process the entire area result information with an expression space coordinate system, and analyze and process on any one of zone areas requiring additional zone processing with the expression space coordinate system to represent a three-dimensional simulation result;
   an interactive mode management module unit configured to set and manage a processing procedure to be reflected in the interactive adaptation rendering module unit according to a simulation result and an interaction data type;
   a zone interaction processing module unit configured to generate and manage an interaction data processing accumulation map for an element changing the simulation result, and process and manage an area requiring a correction of the simulation result; and
   an interactive adaptation rendering module unit configured to express a fire situation by adding the result to an existing rendering method according to mode setting of the interactive mode management module unit based on the simulation result.

2. The system of claim 1, wherein the simulation result management module unit includes:
   a simulation result global input module unit configured to receive the entire area data;
   a simulation result spot input module unit configured to receive specific point data of the zone area;
   a global-zone area management module unit configured to increase efficiency in data application by dividing and managing an area where a change is required in the zone area among the simulation results; and
   a spot data analysis module unit configured to interpret a temperature or carbon dioxide ($CO_2$) simulation result of the zone area from the simulation result.

3. The system of claim 1, wherein the interactive adaptation rendering module unit includes:
   a fire dynamics simulator result rendering module unit configured to determine a user's view in a mode that moves within a scene without changing the simulation result; and
   when the simulation result needs to be changed, a simulation result interactive adaptation zone rendering module unit configured to perform rendering to weaken a fire expression value of the simulation result by reflecting the interaction data processing map provided from the zone interaction processing module unit.

4. The system of claim 2, wherein the fire dynamics simulator result global input module unit converts and loads the simulation result data, which is run-length encoded binary data, into decoded 3D volume data.

5. The system of claim 2, wherein the fire dynamics simulator result point input module unit receives the corresponding spot value from the fire dynamics simulator result global input module unit, or loads and decodes only the corresponding data at a location of the zone area among the run-length encoding data which is an original result to receive information.

6. The system of claim 1, wherein the interactive mode management module unit includes:
   a user navigation mode management module unit configured to obtain location and direction data of a user from a user location change device, output a result, and transmit the result to the interactive adaptation rendering module unit; and
   a simulation result interactive mode management module unit configured to transmit the interaction data input information giving a change in a fire expression result to the zone interaction processing module unit.

7. The system of claim 1, wherein the zone interaction processing module unit includes:
   a zone interaction information setting module unit configured to set an interaction area in the zone area; and
   a simulation result change interaction data processing module unit configured to accumulate and process the interaction data in a 3D spatial map within the corresponding area set by the zone interaction information setting module unit.

8. A method for high-precision fire simulation-based virtual fire training interaction, comprising:
   a simulation result management step performed by a simulation result management module unit, and receiving an entire area result information of a fire dynamics simulator (FDS) and interpreting and processing the entire area result information with an expression space coordinate system, and analyzing and processing any one of zone areas requiring additional zone processing with the expression space coordinate system to represent a three-dimensional simulation result;

an interactive mode management step performed by an interactive mode management module unit, and setting and managing a processing procedure to be reflected in an interactive adaptation rendering module unit according to a simulation result and an interaction data type;

a zone interaction processing step performed by a zone interaction processing module unit of module unit, and generating and managing an interaction data processing accumulation map for an element changing the simulation result, and processing and managing an area requiring a correction of the simulation result; and an interactive adaptation rendering step performed by the interactive adaptation rendering module unit, and expressing a fire situation by adding the result in consideration of the depth relationship according to mode setting of the interactive mode management module unit based on the simulation result.

9. The method of claim 8, wherein the simulation result management step includes:

a simulation result global input step performed by a simulation result global input module unit and receiving entire area data;

a simulation result spot input step performed by a simulation result global input module unit and receiving additional data of a zone area;

a global-zone area management step performed by a global-zone area management module unit, and increasing efficiency in data application by dividing and managing an area requiring a change in the zone area among the simulation results; and a spot data analysis step performed by a spot data analysis module unit, and analyzing temperature or carbon dioxide ($CO_2$) simulation result which is additional data of the zone area in the simulation result.

10. The method of claim 8, wherein the interactive adaptation rendering step includes:

a fire dynamics simulator result rendering step performed by a fire dynamics simulator result rendering module unit, and determining a user's view in a mode that moves within a scene without changing the simulation result; and a simulation result interactive adaptation zone rendering step performed by a simulation result interactive adaptation zone rendering module unit, and when the simulation result needs to be changed, performing rendering that weakens a fire expression value of the simulation result by reflecting the interaction data processing map provided from the zone interaction processing module unit.

11. The method of claim 9, wherein the fire dynamics simulator result global input step includes converting and loading the simulation result data, which is run-length encoded binary data, into decoded 3D volume data.

12. The method of claim 9, wherein the fire dynamics simulator result point input step includes loading and decoding data of the corresponding location among the additionally encoded simulation data when the fire dynamics simulator result global input module unit information is used or when there is no information, and receiving the information.

13. The method of claim 8, wherein the interactive mode management step includes:

a user navigation mode management step performed by a user navigation mode management module unit, and obtaining location and direction data of a user from a user location change device, output a result, and transmit the result to the interactive adaptation rendering module unit; and a simulation result interaction mode management step performed by a simulation result interactive mode management module unit, and transmitting the interaction data input information giving a change in a fire expression result to the zone interaction processing module unit.

14. The method of claim 8, wherein the zone interaction processing step includes:

a zone interaction information setting step performed by a zone interaction information setting module unit, and setting an interaction area in the zone area; and a simulation result change interaction data processing step performed by a simulation result change interaction data processing module unit, and accumulating and processing the interaction data in a 3D spatial map within the corresponding area set by the zone interaction information setting module unit.

* * * * *